United States Patent [19]

Balas et al.

[11] Patent Number: 5,266,649
[45] Date of Patent: Nov. 30, 1993

[54] COLOR STABLE COUPLED DIENE POLYMERS AND HOT MELT ADHESIVES CONTAINING THEM

[75] Inventors: Jaroslav G. Balas; Jeffrey G. Southwick, both of Houston, Tex.

[73] Assignee: Shell Oil Company, Houston, Tex.

[21] Appl. No.: 891,616

[22] Filed: Jun. 1, 1992

[51] Int. Cl.$^5$ .......................................... C08F 297/04
[52] U.S. Cl. .................................. 525/314; 525/254; 525/342
[58] Field of Search ................................ 525/254, 314

[56] References Cited

U.S. PATENT DOCUMENTS

| | | | |
|---|---|---|---|
| 2,386,452 | 10/1945 | Fleming et al. | 260/462 |
| 3,149,182 | 9/1964 | Porter | 260/879 |
| 3,244,664 | 4/1966 | Zelinski et al. | 260/94.7 |
| 3,503,943 | 3/1970 | Kresge et al. | 525/342 |
| 3,725,369 | 4/1973 | Halasa et al. | 525/254 |
| 3,840,616 | 10/1974 | Clark et al. | 260/827 |
| 3,880,954 | 4/1975 | Kahle et al. | 525/254 |
| 4,096,203 | 6/1978 | St. Clair | 524/505 |
| 4,137,391 | 1/1979 | Smith et al. | 525/254 |
| 4,139,519 | 2/1979 | Itoh et al. | 525/254 |
| 4,882,384 | 11/1989 | Willis et al. | 525/314 |
| 5,093,430 | 3/1992 | Sakagami et al. | 525/314 |
| 5,118,762 | 6/1992 | Chin | 525/314 |

FOREIGN PATENT DOCUMENTS 1266156 10/1989 Japan ................................ 525/314

OTHER PUBLICATIONS

Wittenberg/Gilman, Organosilymetallic Compounds: Their Formation and Reactions, and Comparison With Related Types, 1959, pp. 116-145.
Zelinski/Wofford, Synthesis of Trichain and Tetrachain Radial Polybutadiens, 1965, 93-103.

Primary Examiner—Paul R. Michl
Assistant Examiner—Olga Asinovsky
Attorney, Agent, or Firm—Donald F. Haas

[57] ABSTRACT

Diene polymers comprising at least one diene polymer block and at least one other polymer block which are coupled together with a coupling agent of the formula

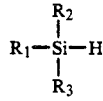

wherein $R_1$, $R_2$ and $R_3$ are alkyl or alkoxy containing up to 20 carbon atoms or more and at least of them are alkoxy. Adhesive formulations containing such polymers are also within the scope of the invention.

10 Claims, 2 Drawing Sheets

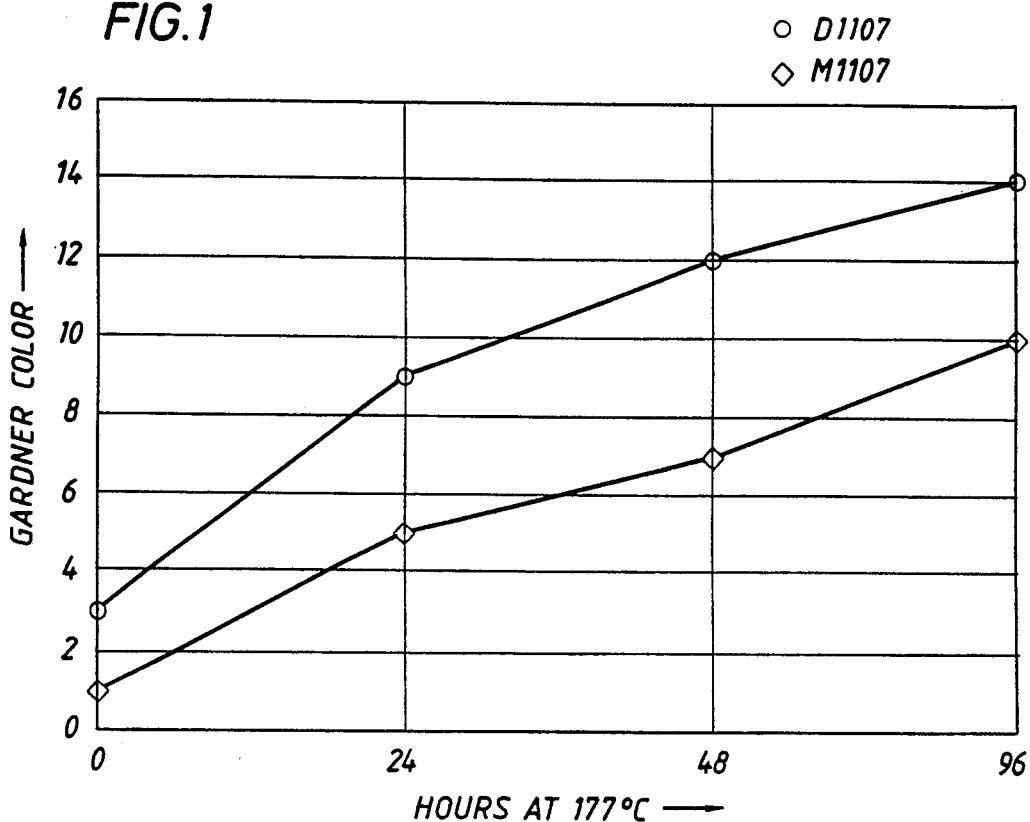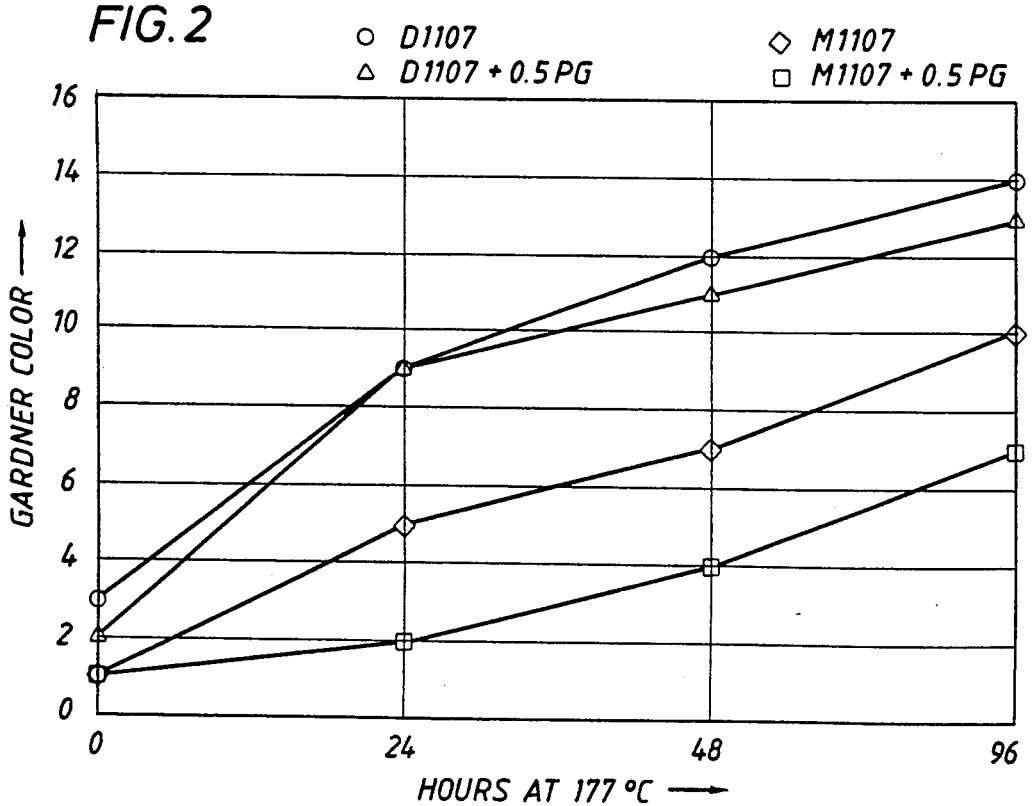

COLOR STABLE COUPLED DIENE POLYMERS AND HOT MELT ADHESIVES CONTAINING THEM

BACKGROUND OF THE INVENTION

This invention relates to the reduction of color formation in diene polymers and hot melt adhesive formulations which contain such diene polymers, especially block copolymers of conjugated dienes and vinyl aromatic hydrocarbons. More particularly, it relates to the reduction of such color formation by the use of coupling agents whose by-products of reaction do not contribute to color formulation.

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene such as butadiene or isoprene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases—a continuous elastomeric phase (blocks B) and a basically discontinuous hard, glass-like plastic phase (blocks A) called domains. Since the A—B—A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomenon allows the A—B—A rubber to behave like a conventionally vulcanized rubber in the unvulcanized state and is applicable for various uses. For example, these network forming polymers are applicable for uses such as adhesive formulations; as moldings of shoe soles, etc.; impact modifier for polystyrene resins and engineering thermoplastics; modification of asphalt; etc.

Many such polymers are made by coupling with coupling agents as described in U.S. Pat. No. 4,096,203. Such coupling agents, including dibromoethane, may contain halogens. With halogen-containing coupling agents, the coupling reaction results in the formation of Lithium halide, LiX. This can cause the polymer to turn brown when the temperature is elevated, a disadvantage for applications such as films and coatings, especially when high clarity is required.

Adhesive formulations containing coupled polymers containing LiI, LiCl or LiBr (but not LiF) salts are known to develop a brown color when aged at high temperatures such as 177° C. This problem does not occur in sequentially polymerized polymers. This is considered a problem for hot melt adhesive manufacturers who sometimes hold adhesives at high temperatures for extended times during hot melt application. The brown color is undesirable for many end uses for such adhesive products such as diaper assembly, clear labels, clear tapes, clear decals, etc.

We have found that color generation is not correlated with increased oxidative degradation. Thus, the commonly used methods for dealing with color formation in polymers are not effective in this situation. We have found that, the use of specific coupling agents and antioxidants will greatly reduce the color formation in these polymers and hot melt adhesive formulations containing them.

SUMMARY OF THE INVENTION

The present invention provides a color stable diene polymer which comprises at least one diene polymer block and at least one other polymer block which are coupled together with a coupling agent of the formula

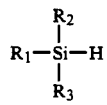

wherein $R_1$, $R_2$ and $R_3$ are alkyl or alkoxy containing up to 20 carbon atoms or more and at least 2 of them must be alkoxy. In a preferred embodiment, the color stable polymer is comprised of at least two blocks of a vinyl aromatic hydrocarbon and at least one block of a diene. In the most preferred embodiment, a piosphite antioxidant is added to the polymer to increase its color stability. The most preferred coupling agent is methyl dimethoxy silane but dimethyl dimethoxy silane and difluoro diphenyl silane are also preferred. The invention also encompasses a hot melt adhesive formulation comprising the color stable polymer of the present invention.

BRIEF DESCRIPTION OF THE DRAWINGS

FIG. 1 is a plot of Gardner color versus time in which the color stability of hot melt adhesive formulations made with a commercial polymer and a polymer coupled with methyl dimethoxy silane are compared.

FIG. 2 is a similar plot wherein the effect of adding a phosphite antioxidant to the adhesive formulation is also compared.

DETAILED DESCRIPTION OF THE INVENTION

Figure 3:
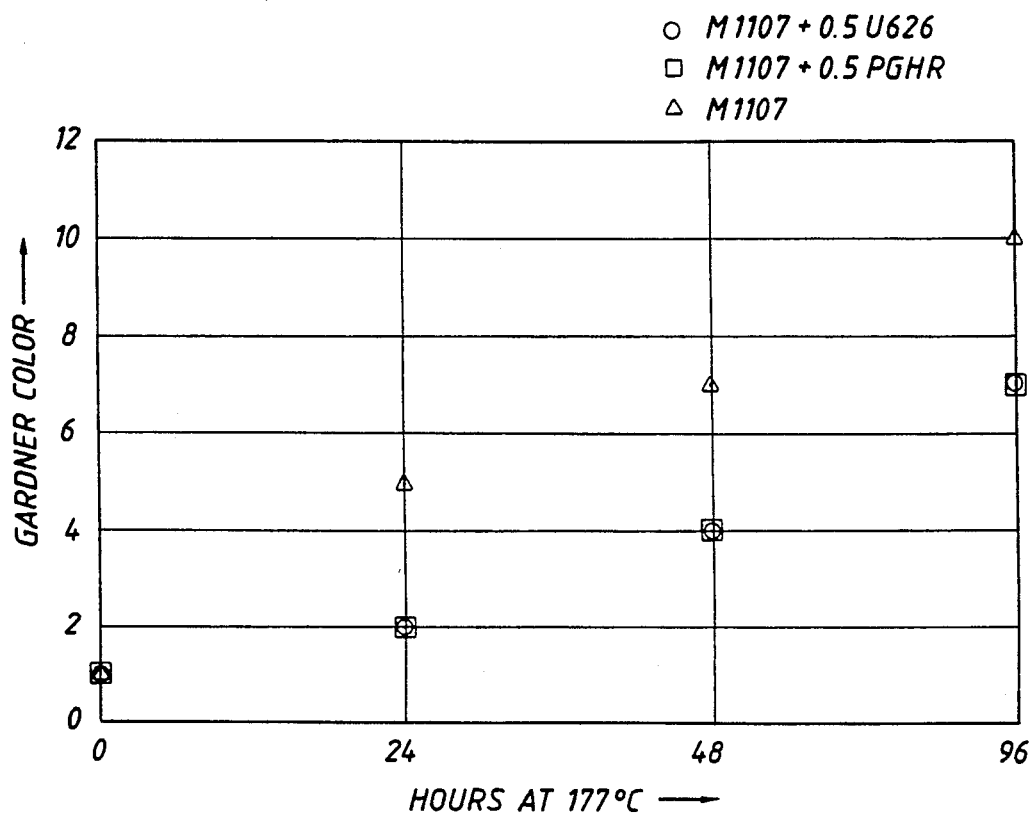
FIG. 3 is a similar plot which compares adhesive formulations made with methyl dimethoxy silane-coupled polymers with 2 different phosphite antioxidants and also without phosphite antioxidant.

As is well known, polymers containing both aromatic and ethylenic unsaturation can be prepared by copolymerizing one or more polyolefins, particularly a diolefin, in this case butadiene and isoprene, with one or more alkenyl aromatic hydrocarbon monomers, in this case styrene. Other diolefins such as 2,3-dimethyl-1,3-butadiene, 1,3-pentadiene, 1,3-hexadiene and the like, and other vinyl aromatic hydrocarbons such as o-methylstyrene, p-methylstyrene, p-tertbutylstyrene, 1,3-dimethylstyrene, alphamethylstyrene, vinylnapthalene, vinylanthracene and the like may be used. The copolymers may, of course, be random, tapered, block or a combination of these, in this case block.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as ABA block copolymers are frequently prepared in solution using anionic polymerization techniques. In general, when solution anionic techniques are used, these ABA block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

In general , any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, tetrahydrofuran and the likes.

The process by which the block copolymers are prepared is not critical to this invention except that the polymers are produced by the well known coupling technique of block polymerization as described in U.S. Pat. No. 4,096,203 which is herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356. The disclosures of all of the patents mentioned in this paragraph are herein incorporated by reference. If desired, these block copolymers can be hydrogenated. Hydrogenation may be effected selectively as disclosed in U.S. Pat. No. Re: 27,145 or 5,039,755 which are herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts.

As discussed above, polymers coupled with conventional coupling agents containing halogen, when used alone or in hot melt adhesives or in other applications, have a tendency to turn brown when aged at high temperature. We have found that this phenomenon is not caused by the commonly known phenomenon of oxidative degradation. The normal methods of reducing color formation due to such causes do not stop this color formation in polymers of conjugated dienes or copolymers thereof with vinyl aromatic hydrocarbons containing Cl−, Br−, or I−, but not F−.

Many block copolymers of conjugated dienes and vinyl aromatic hydrocarbons contain residual lithium bromide because of the process by which they are made. It is our theory that the color formation in these polymers and hot melt adhesive formulations containing these polymers is caused by the presence of lithium bromide in the polymer. We feel that the color is caused by the reaction of lithium bromide with oxygen. We have been able to achieve a color reduction by reducing the level of lithium bromide in the polymer by water washing the polymer cement. This approach has serious drawbacks since water washing requires a large capital investment.

As stated above, we have found that we can produce a color stable diene polymer which comprises at least one diene polymer block and at least one other polymer block wherein the two or more blocks are coupled together with a coupling agent of the formula set forth in the Summary of the Invention section. The preferred coupling agent of this class is methyl dimethoxy silane. Other coupling agents which will provide the advantages of the present invention are dimethyl dimethoxy silane and, surprisingly difluoro diphenyl silane. These coupling agents simply replace the conventional coupling agents normally used in the process described above.

It is preferred to use polymers made with these coupling agents in combination with phosphite antioxidants. Use of such antioxidants improves the color stability of the polymers of the present invention to a much greater degree than that of prior art coupled polymers. We think this occurs because the darkening of hot melt color due to the oxidation of Lithium halide salts is so intense, it essentially masks the improvement in color that can be obtained with phosphite antioxidants. Examples of phosphite antioxidants include trisnonylphenyl phosphite; Polygard HR; tris-mixed mono and di nonylphenyl phosphite; Vltranox 626, bis(2,4-di-t-butyl) pentaerythritol diphosphite; and Irgafos 168, tris(2,4-di-t-butyl phenyl) phosphite.

These polymers are particularly applicable for use in hot melt adhesive formulations. Such formulations are often subjected to high temperatures, such as 177° C., at which the prior art polymers experience discoloration problems. The use of the polymers of the present invention in such hot melt adhesive formulations will eliminate the discoloration problem. The polymers of the present invention may also be used to advantage in applications such as films, and elastomeric coatings wherein discoloration of the polymer and the product is a significant disadvantage.

It may be necessary to add an adhesion promoting or tackifying resin that is compatible with the elastomeric conjugated diene block. A common tackifying resin is a diene-olefin copolymer of piperylene and 2-methyl-2- butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398 which is incorporated by reference. Other tackifying resins of the same general type may be employed in which the resinous copolymer comprises 20-80 weight percent of piperylene and 80-20 weight percent of 2-methyl-2butene. The resins normally have softening points (ring and ball) between about 80° C. and about 115° C.

Other adhesion promoting resins which are also useful in the compositions of this invention include hydrogenated rosins, esters of rosins, polyterpenes, terpenephenol resins and polymerized mixed olefins. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from about 20 to about 400 parts by weight per hundred parts rubber (phr), preferably between about 100 to about 350 phr. The selection of the particular tackifying agent is, in large part, dependent upon the specific block copolymer employed in the respective adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from 0 to about 100 phr, and preferably between about 0 to about 60 phr.

Optional components of the present invention are stabilizers which inhibit or retard heat degradation, oxidation, skin formation and color formation caused by the commonly known yellowing due to oxidative degradation. Stabilizers are typically added to the commercially available compounds in order to protect the polymers against heat degradation and oxidation during the preparation, use and high temperature storage of the adhesive composition. The phosphites may also provide some of these advantages. Additional stabilizers known in the art may also be incorporated into the adhesive composition.

EXAMPLE I

In this example, hot melt adhesives were compounded in a Sigma blade mixer utilizing the following formulation: 25% KRATON ® D1107 rubber (a linear styrene-isoprene-styrene block copolymer), a commercially available polymer coupled with a halogen containing coupling agent, or M1107 rubber (a very similar block copolymer), which is coupled with methyl dimethoxy silane, 60% ESCOREZ ® 5300 hydrogenated resin, 15% TUFFLO ® 6056 oil and 0.5% IRGANOX ® 1010 antioxidant (tetrakis[methylene(3,5-di-tert-butyl-4-hydroxy hydrocinnamate)]methane). Both KRATON ® D1107 and M1107 also contain small quantities of BHT (0.3%). This formulation was used because the particular resin and oil are very color stable and it is theorized that differences in color formation must then be due to the coupling agent used. M1107, the methyl dimethoxy silane-coupled polymer, was made by the same procedure used to make the KRATON ® D1107 polymer except that MDMS was used as the coupling agent instead of dibromo ethane.

Aging of the formulation was performed at 177° C. with 100 grams of adhesive formulation in a 200 ml Griffin tallform beaker covered with aluminum foil. Aliquots of the aged adhesive were poured off into 10 ml beakers and these samples were color rated with a Gardner color comparator. Adhesive color was determined initially and after aging for 24, 48 and 96 hours. The data obtained is plotted in FIG. 1 which shows the color stability as a function of the change in Gardner color over time. It can be seen that the color of the methyl dimethoxy silane-coupled polymer is at all times considerably lower than the color of the commercial polymer coupled with a halogen-containing coupling agent.

EXAMPLE II

The procedure of Example I was utilized in this set of experiments as were the polymers used in Example I. 0.5 wt.% of POLYGARD HR antioxidant, trim-(mixed mono- and di-nonylphenyl) phosphite with triisopropanol amine from Uniroyal Chemical Group, was added to the adhesive formulations and the color stability was observed as in Example I.

FIG. 2 is a plot of the data from this set of experiments combined with the data from Example I. It can be seen that the addition of the phosphite antioxidant slightly increases the color stability of the polymer coupled with a coupling agent containing halogen. However, there is a much more dramatic increase in color stability when the phosphite antioxidant is combined with a polymer which has been coupled with methyl dimethoxy silane.

EXAMPLE III

In this set of experiments, the procedure of Example II was followed. An additional adhesive formulation was made up, this time incorporating 0.5 wt.% of ULTRANOX ® 626 antioxidant, bis(2,4-di-t-butyl)pentaerythritol diphosphite from Borg Warner Corporation. The polymer was the methyl dimethoxy silane-coupled polymer. The color of the formulation was measured at 24, 48 and 96 hours and the results were exactly the same as those for the same polymer incorporating the POLYGARD HR antioxidant in Example II. FIG. 3 is a plot of the data of this example combined with the data from Example II for the methyl dimethoxy silane-coupled polymer. It can be seen that both types of phosphite antioxidants dramatically increase the color stability of the adhesive formulation.

EXAMPLE IV

The procedure of Example I was followed herein except that the polymer of the invention, F1107, was coupled with diphenyldifluorosilane. The adhesive was aged as above and the results, shown in Table 1, prove that using diphenyldifluorosilane decreases the color formation.

TABLE 1

| | GARDNER COLOR NO. | | | |
|---|---|---|---|---|
| | 0 | 24 | 48 | 96 hrs. |
| D 1107 | 2 | 9 | 11 | 14 |

TABLE 1-continued

| | GARDNER COLOR NO. | | | |
|---|---|---|---|---|
| | 0 | 24 | 48 | 96 hrs. |
| F 1107 | 1 | 1 | 6 | 8 |

We claim:

1. A color stable ABA block copolymer which comprises one diene polymer block (B) and two alkenyl aromatic hydrocarbon polymer blocks (A) which are coupled together with a coupling agent of the formula

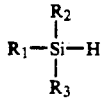

wherein $R_1$, $R_2$ and $R_3$ are alkyl or alkoxy and two of $R_1$, $R_2$ and $R_3$ are alkoxy.

2. The color stable polymer of claim 1 which has a phosphite antioxidant incorporated therein.

3. The color stable polymer of claim 1 wherein the coupling agent is methyl dimethoxy silane.

4. A hot melt adhesive formulation comprising the polymer of claim 1.

5. A hot melt adhesive formulation comprising the polymer of claim 2.

6. A color stable diene polymer which comprises at least one diene polymer block and at least one other polymer block which are coupled together with a coupling agent which is difluoro diphenyl silane.

7. The color stable polymer of claim 6 which is comprised of at least two polymer blocks of a vinyl aromatic hydrocarbon and at least one diene polymer block.

8. The color stable polymer of claim 7 which has a phosphite antioxidant incorporated therein.

9. A hot melt adhesive formulation comprising the polymer of claim 7.

10. A hot melt adhesive formulation comprising the polymer of claim 8.

* * * * *